(12) United States Patent  (10) Patent No.: US 7,630,819 B2
Sekiguchi  (45) Date of Patent: Dec. 8, 2009

(54) VEHICLE DRIVING SUPPORT APPARATUS

(75) Inventor: Mamoru Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 711 days.

(21) Appl. No.: 11/281,618

(22) Filed: Nov. 18, 2005

(65) Prior Publication Data

US 2006/0111831 A1  May 25, 2006

(30) Foreign Application Priority Data

Nov. 19, 2004 (JP) .......................... P2004-336393

(51) Int. Cl.
 *B60T 7/12* (2006.01)
(52) U.S. Cl. ........................................ 701/96; 701/300
(58) Field of Classification Search .................. 701/93, 701/96, 117, 119, 300, 301; 180/170–179
See application file for complete search history.

(56) References Cited

U.S. PATENT DOCUMENTS 7,096,109 B2 * 8/2006 Tanimichi et al. .............. 701/96

7,451,039 B2 * 11/2008 Kerner ........................ 701/117

FOREIGN PATENT DOCUMENTS

JP 2002-127781 5/2002

* cited by examiner

*Primary Examiner*—Richard M. Camby
(74) *Attorney, Agent, or Firm*—McGinn IP Law Group, PLLC

(57) ABSTRACT

In an automatic follow-up control, a traveling control unit calculates and sets target intervehicular time on the basis of own vehicle velocity and calculates target acceleration on the basis of an intervehicular distance between an own vehicle and a preceding vehicle, preceding vehicle velocity, the own vehicle velocity, and the target intervehicular time to perform automatic brake control, automatic acceleration control, and the like. The target intervehicular time is calculated and set according to a function of the own vehicle velocity. The function is set as a function of a tendency that, as the own vehicle velocity increases, the target intervehicular time decreases. The function has at least a term in which a first set value and a second set value are defined in advance, the own vehicle velocity is raised to the power of the second value and then multiplied by the first set value.

15 Claims, 2 Drawing Sheets

VEHICLE DRIVING SUPPORT APPARATUS

CROSS REFERENCE TO RELATED APPLICATIONS

The disclosure of Japanese Application No. 2004-336393 filed on Nov. 19, 2004 including the specification, drawings, and abstract is incorporated herein by reference in its entirety.

BACKGROUND OF THE INVENTION

1. Field of the Invention

The present invention relates to a vehicle driving support apparatus, particularly the apparatus controls the vehicle to follow-up a leading vehicle detected by a stereo camera, a monocular camera, a millimeter wave radar, or the like, in front of an own vehicle 2. Description of the Related Art In recent years, ACC system (Adaptive Cruise Control System) has been put to practical use. This system detects a traveling environment ahead of a vehicle with a camera or the like mounted on the vehicle and detects a leading vehicle from data of the traveling environment to perform follow-up traveling control for the leading vehicle and keep an intervehicular distance or the like between the vehicle and the leading vehicle at a predetermined distance or more.

For example, Japanese Patent unexamined publication 2002-127781 discloses a technique for calculating intervehicular time, which is a time difference until an own vehicle reaches a present position of a leading vehicle, on the basis of an intervehicular distance and own vehicle velocity and controlling an electronic throttle and a brake actuator in order to keep the intervehicular time at target intervehicular time (a fixed value) set in advance. In this case, when a magnitude of deceleration of the leading vehicle increases to a first defined value or more, a predetermined correction value is added to the target intervehicular time to obtain corrected intervehicular time. Acceleration and deceleration control is performed with the corrected intervehicular time set as a target.

Incidentally, a driver feels it more natural if the target intervehicular time set in the above publicaiton takes different values according to traveling states of the own vehicle. With the target intervehicular time of a fixed value in the above publication, even if the target intervehicular time is corrected when the leading vehicle decelerates, the driver, who is performing follow-up traveling, cannot perform follow-up traveling with natural and satisfactory feeling. On the other hand, with respect to follow-up control in control performed in a low speed range and control performed in a medium and high speed range, it is difficult to use target intervehicular time in common from the viewpoint of an intervehicular distance to be secured, a margin for time, and the like. The difference of target intervehicular time gives the driver an unnatural feeling at a boundary of the low speed range and the medium and high speed range.

SUMMARY OF THE INVENTION

An object of the invention is to provide a vehicle driving support apparatus that can continuously use target intervehicular time in common in both follow-up control in a low speed range and follow-up control in a medium and high speed range and that a driver can use with natural feeling.

A vehicle driving support apparatus according to the invention includes: an own-vehicle-traveling-information detecting unit that detects traveling information of an own vehicle; a leading-vehicle-information detecting unit that recognizes a leading vehicle and detects information on the leading vehicle; a target-intervehicular-time setting unit that sets target intervehicular time as a function of own vehicle velocity detected by the own-vehicle-traveling-information detecting unit; a target acceleration calculating unit that calculates target acceleration on the basis of the own vehicle traveling information, the leading vehicle information, and the target intervehicular time; and an acceleration and deceleration control unit that performs acceleration and deceleration control on the basis of the target acceleration.

The vehicle driving support apparatus according to the invention can continuously use target intervehicular time in common in both follow-up control in a low speed range and follow-up control in a medium and high speed range. This makes it possible for a driver to use the driving support apparatus with natural feeling.

DESCRIPTION OF THE PREFERRED EMBODIMENTS

An embodiment of the invention will be hereinafter explained with reference to the accompanying drawings.

Figure 1:
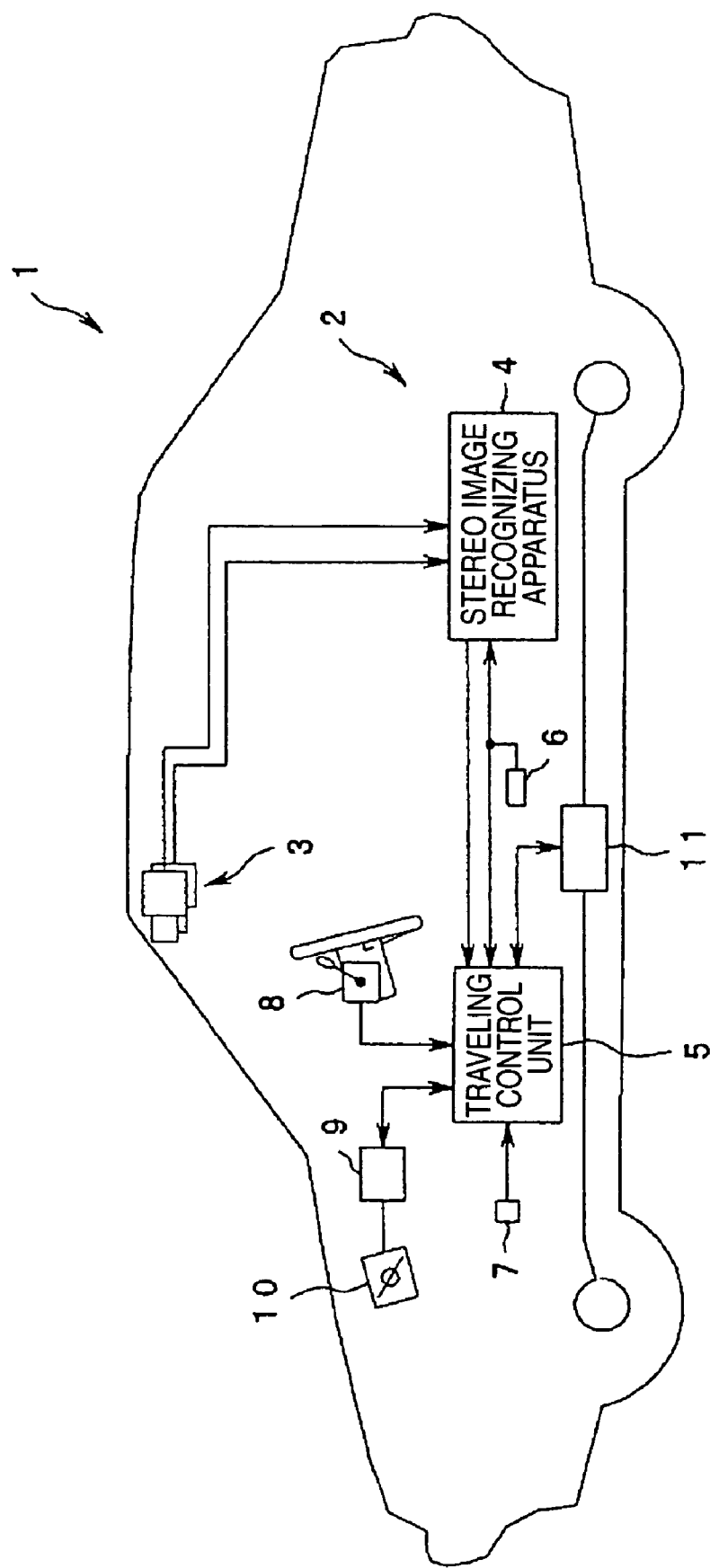
FIG. 1 is a schematic diagram of a vehicle driving support apparatus mounted on a vehicle.
Figure 2:
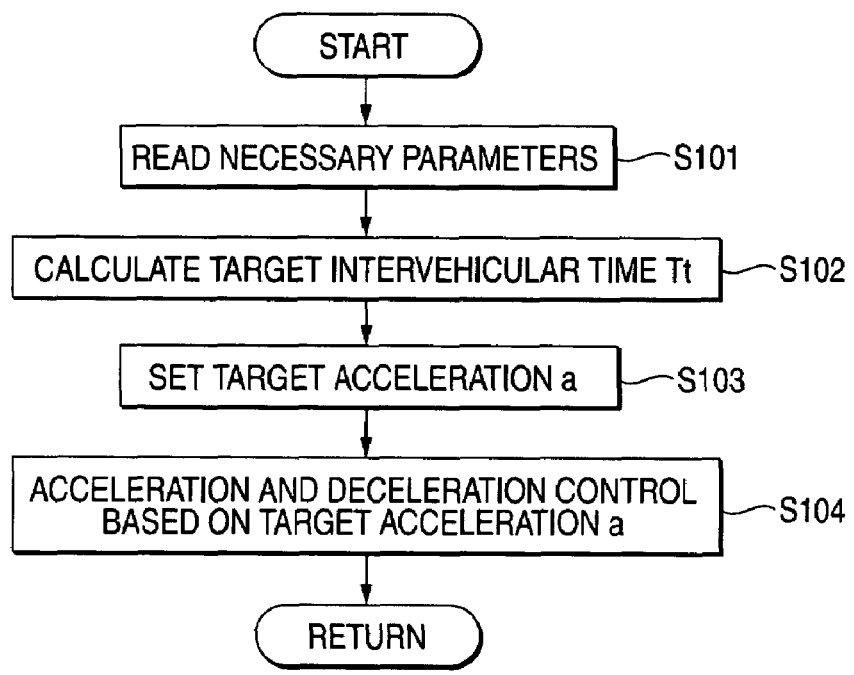
FIG. 2 is a flowchart of an automatic follow-up control program.
Figure 3:
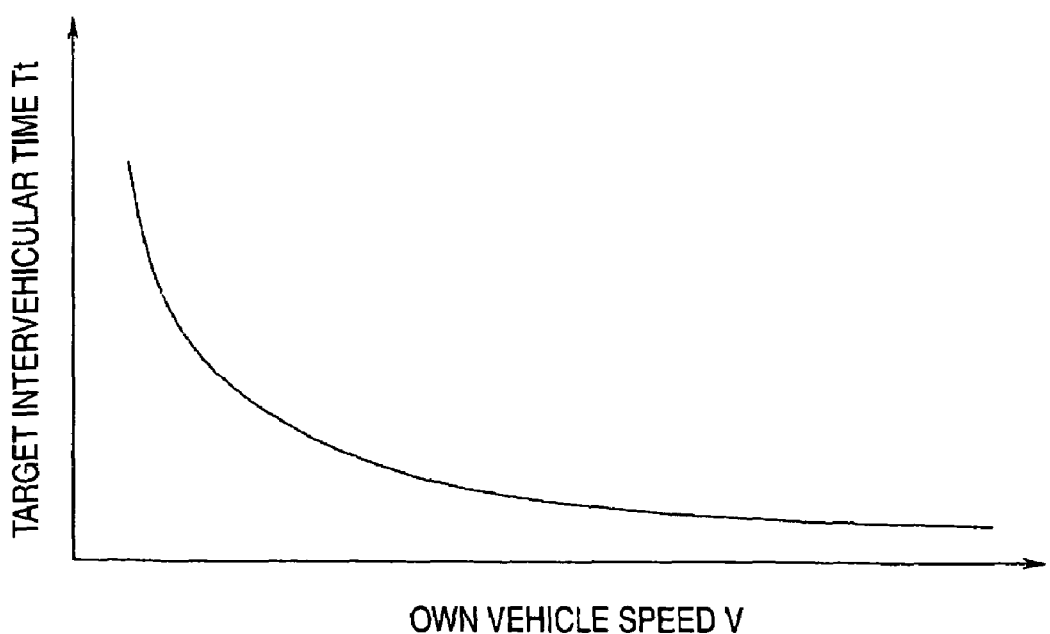
FIG. 3 is a characteristic chart of target intervehicular time.

FIGS. 1 to 3 are diagrams of an embodiment of the invention. FIG. 1 is a schematic diagram of a driving support apparatus mounted on a vehicle. FIG. 2 is a flowchart of an automatic follow-up control program. FIG. 3 is a characteristic chart of target intervehicular time.

In FIG. 1, reference numeral 1 denotes a vehicle (an own vehicle) such as an automobile. An Adaptive Cruise Control (ACC) system 2, is mounted on the own vehicle 1. The ACC system 2 mainly includes a stereo camera 3, a stereo image recognizing apparatus 4, and a traveling control unit 5. With the ACC system 2, basically, controls a vehicle velocity in a constant velocity set by a driver in the case no leading vehicle is present. Further, the own vehicle 1 is controlled by an automatic follow-up control program in FIG. 2 described later in the case a leading vehicle is detected. The automatic follow-up control program is a program for calculating and setting target intervehicular time Tt on the basis of own vehicle velocity V0 and calculating target acceleration "a" on the basis of an intervehicular distance L between the own vehicle 1 and the leading vehicle, leading vehicle velocity Vf, the own vehicle velocity V0, and the target intervehicular time Tt to perform automatic brake control (including follow-up stop control), automatic acceleration control (including follow-up start control), and the like. Details of the automatic follow-up control program are described later. The automatic follow-up control program is executed by the traveling control unit 5. Therefore, the traveling control unit 5 functions as a target intervehicular time setting unit, a target acceleration calculating unit, and an acceleration and deceleration control unit.

The stereo camera 3 is constituted by a pair of (left and right) CCD cameras, which use solid-state imaging devices such as charge coupled devices (CCDs), as a stereo optical system. The left and right CCD cameras are attached to a front part of a ceiling in a vehicle interior at a fixed interval, respectively. The CCD cameras stereoscopically images an object outside the own vehicle 1 from different viewpoints and outputs images to the stereo image recognizing apparatus 4.

The own vehicle 1 also includes a vehicle velocity sensor 6, which detects the own vehicle velocity V0, serving as the own vehicle traveling information detecting unit. The own vehicle velocity V0 is outputted to the stereo image recognizing apparatus 4 and the traveling control unit 5. An ON-OFF signal of a brake pedal from the brake switch 7 of the own vehicle 1 is inputted to the traveling control unit 5.

The images from the stereo cameras 3 and the own vehicle velocity V0 from the vehicle velocity sensor 6 are inputted to the stereo image recognizing apparatus 4. The stereo image recognizing apparatus 4 detects forward information of three-dimensional object data and white line (such as lane marker) data in front of the own vehicle 1 on the basis of the images from the stereo cameras 3 and estimates a traveling path of the own vehicle 1 (an own vehicle traveling path). The stereo image recognizing apparatus 4 extracts a leading vehicle in front of the own vehicle 1 and outputs data such as a leading vehicle distance (an intervehicular distance) L, leading vehicle velocity ((an amount of change in the intervehicular distance L)+(the own vehicle velocity V0)) Vf, leading vehicle acceleration (a differential value of the leading vehicle velocity Vf) af, positions of stationary objects other than the leading vehicle, white line coordinates, a white line recognition distance, and own vehicle traveling path coordinates to the traveling control unit 5.

Processing of the images from the stereo camera 3 in the stereo image recognizing unit 4 is performed, for example, as described below. First, the stereo image recognizing apparatus 4 applies processing for obtaining distance information over an entire image from a deviation amount of corresponding positions according to the principle of triangulation to a pair of stereo images of an environment in a traveling direction of the own vehicle 1 imaged by the CCD cameras of the stereo camera 3. The stereo image recognizing apparatus 4 generates a distance image representing a three-dimensional distance distribution. Then, on the basis of the data, the stereo image recognizing apparatus 4 performs well-known grouping processing, compares the data with three-dimensional road shape data, three-dimensional object data, and the like stored in advance, and extracts white line data, sidewall data of a guard rail, curbstones, and the like present along a road, and three-dimensional object data of vehicles and the like. As the three-dimensional object data, a distance to a three-dimensional object and a temporal change in the distance (velocity relative to velocity of the own vehicle 1) are calculated. In particular, vehicles on the own vehicle traveling path, which are closest to the own vehicle 1 and traveling at predetermined velocity (e.g., 0 km/h or more) substantially in the same direction as the own vehicle 1, are extracted as leading vehicles. Note that a vehicle traveling at the velocity Vf of substantially 0 km/h among the preceding vehicles is recognized as a stopped preceding vehicle. The stereo camera 3 and the stereo image recognizing apparatus 4 are provided as leading vehicle information detecting units.

The traveling control unit 5 realizes a function of constant velocity traveling control for performing constant velocity traveling control to maintain traveling velocity set by an operation input of a driver and a function of automatic follow-up control shown in FIG. 2 described later. A constant velocity traveling switch 8 including plural switches, which is coupled to a constant traveling operation lever provided on a side or the like of a steering column, the stereo image recognizing apparatus 4, the vehicle velocity sensor 6, the brake switch 7, and the like are connected to the traveling control unit 5.

The constant velocity traveling switch 8 includes a vehicle velocity set switch for setting target vehicle velocity at the time of constant velocity traveling, a coast switch for mainly changing the target vehicle velocity to a falling side and setting the target vehicle velocity, and a resume switch for mainly changing the target vehicle velocity to a rising side and setting the target vehicle velocity. A main switch (not shown) for turning ON/OFF in constant velocity traveling control and in automatic follow-up control is disposed near the constant velocity traveling operation lever.

When the driver turns ON the not-shown main switch and sets desired velocity with the constant velocity traveling operation lever, a signal from the constant velocity traveling switch 8 is inputted to the traveling control unit 5. The traveling control unit 5 outputs a signal to a throttle valve control device 9 and feedback-controls opening of a throttle valve 10 such that vehicle velocity detected by the vehicle velocity sensor 6 converges to the vehicle velocity set by the driver and causes the own vehicle 1 to automatically travel in a constant velocity state. Alternatively, the traveling control unit 5 outputs a deceleration signal to an automatic brake control device 11 to actuate an automatic brake.

While the traveling control unit 5 is performing the constant velocity traveling control, when the stereo image recognizing apparatus 4 recognizes a leading vehicle, the traveling control unit 5 is automatically switched to the automatic follow-up control described later under predetermined conditions. Note that the function of the constant velocity traveling control and the functions of the automatic follow-up control are cancelled when the driver steps on the brake, when the own vehicle velocity V0 exceeds an upper limit value set in advance, or when the main switch is turned OFF.

In the automatic follow-up control program in the traveling control unit 5, as shown in FIG. 2, first, in step (hereinafter abbreviated as "S") 101, the traveling control unit 5 reads necessary parameters. The traveling control unit 5 proceeds to S102 and calculates the target intervehicular time Tt according to, for example, expression (1) below.

$$Tt = \alpha \cdot V0^{-\beta} \quad (1)$$

where α is a first set value, which is a gain larger than 0. In this embodiment, α is set to, for example, 17. β is a second set value, which is a value larger than 0. In this embodiment, β is a value larger than 0 and smaller than 1 and set, for example, between 0.3 and 0.8. The target intervehicular time Tt set according to expression (1) has, for example, a characteristic shown in FIG. 3. A function for defining the target intervehicular time Tt is a function of a tendency that, as the own vehicle velocity V0 increases, the target intervehicular time Tt decreases.

Thereafter, the traveling control unit 5 proceeds to S103 and sets the target acceleration "a" according to expression (2) below on the basis of the intervehicular distance L between the own vehicle 1 and the leading vehicle, the preceding vehicle velocity Vf, the own vehicle velocity V0 read in S101, and the target intervehicular time Tt calculated in S102.

$$a = k1 \cdot (Tt \cdot V0 - L) + k2 \cdot (Vf - V0) \quad (2)$$

where k1 and k2 are constants.

The traveling control unit 5 proceeds to S104 and outputs an instruction signal to the throttle valve control device 9 or the automatic brake control device 11 to perform acceleration and deceleration control on the basis of the target acceleration calculated in S103. Then, the traveling control unit 5 leaves the program.

As described above, according to this embodiment, the target intervehicular time Tt is calculated according to expression (1). Thus, even in the follow-up control in the low speed range and the follow-up control in the medium and high speed range, it is possible to continuously use the target intervehicular time Tt in common. This makes it possible for the driver to use the vehicle driving support apparatus with natural feeling.

Since a combination of the first set value α and the second set value β is changed, it is possible to obtain the target intervehicular time Tt of various characteristics. This makes it possible to reduce time required for design and development significantly.

In this embodiment, the target intervehicular time Tt is obtained according to only expression (1), that is, $Tt=\alpha \cdot V0^{-\beta}$. However, the target intervehicular time Tt may be derived by any function, for example, $Tt=\alpha \cdot V0^{-\beta}+\gamma$ (γ is a constant) as long as the function has the term $\alpha \cdot V0^{-\beta}$.

It is also possible that the target intervehicular time Tt derived by expression (1) is limited to a predetermined area of the own vehicle velocity V0 and the target intervehicular time Tt is derived by other functions or is a fixed value in other areas.

In this embodiment, a leading vehicle is recognized on the basis of images from the stereo camera. However, a leading vehicle may be recognized on the basis of information from other techniques, for example, a millimeter wave radar and a monocular camera.

What is claimed is:

1. A vehicle driving support apparatus comprising:
   an own-vehicle-traveling-information detecting unit that detects traveling information of an own vehicle;
   a leading-vehicle-information detecting unit that recognizes a leading vehicle and detects information on the leading vehicle;
   a target-intervehicular-time setting unit that sets target intervehicular time as a function of own vehicle velocity detected by the own-vehicle-traveling-information detecting unit;
   a target acceleration calculating unit that calculates target acceleration on the basis of the own vehicle traveling information, the leading vehicle information, and the target intervehicular time; and
   an acceleration and deceleration control unit that performs acceleration and deceleration control on the basis of the target acceleration.

2. The vehicle driving support apparatus according to claim 1, wherein the function of the own vehicle velocity defining the target intervehicular time comprises a function of a tendency that, as the own vehicle velocity increases, the target intervehicular time decreases.

3. The vehicle driving support apparatus according to claim 2, wherein the function of the own vehicle velocity defining the target intervehicular time comprises a term in which a first set value and a second set value are defined in advance, the own vehicle velocity is raised to the power of the second value, and the own vehicle velocity raised to the power of the second value is multiplied by the first set value.

4. The vehicle driving support apparatus according to claim 3, wherein the second set value is set to a value grater than 0 and less than 1.

5. The vehicle driving support apparatus according to claim 3, wherein the first set value is set to a value grater than 0.

6. The vehicle driving support apparatus according to claim 5, wherein the second set value is set to a value grater than 0 and less than 1.

7. The vehicle driving support apparatus according to claim 3, wherein the target acceleration calculating unit calculates the target acceleration by the formula $a=K1((Tt)(Vo)-L)+K2(Vf-Vo)$, where a is the target acceleration, K1 and K2 are constants, Tt is the target intervehicular time, Vo is the own vehicle velocity and Vf is a leading vehicle velocity.

8. The vehicle driving support apparatus according to claim 1, wherein the at least one of the target-intervehicular-time setting unit, the target acceleration calculating unit, and acceleration and deceleration control unit deactivates when the own vehicle velocity exceeds an upper limit.

9. The vehicle driving support apparatus according to claim 1, wherein the acceleration and deceleration control unit performs automatic brake control and automatic acceleration control based on the target acceleration.

10. The vehicle driving support apparatus according to claim 1, wherein the leading-vehicle-information detecting unit comprises a stereo camera and a stereo image recognizing apparatus,
    wherein the stereo camera stereoscopically images an object outside the own vehicle from different viewpoints and outputs the image to the stereo image recognizing apparatus, and
    wherein the stereo recognizing apparatus detects information of the object and estimates a traveling path of the own vehicle.

11. The vehicle driving support apparatus according to claim 1, wherein the leading-vehicle-information detecting unit comprises a millimeter wave radar and a monocular camera, which recognizes the leading vehicle.

12. The vehicle driving support apparatus according to claim 1, wherein if the leading-vehicle-information detecting unit detects no leading vehicle, then the acceleration and deceleration control unit maintains the own vehicle velocity at a constant velocity.

13. The vehicle driving support apparatus according to claim 10, wherein the object is the leading vehicle.

14. The vehicle driving support apparatus according to claim 1, wherein a function of the own vehicle velocity defining the target intervehicular time comprises a term in which a first set value and a second set value are defined in advance, the own vehicle velocity is raised to the power of the second value, and the own vehicle velocity raised to the power of the second value is multiplied by the first set value.

15. The vehicle driving support apparatus according to claim 14, wherein the target acceleration calculating unit calculates the target acceleration by the formula $a=K1((Tt)(Vo)-L)+K2(Vf-Vo)$, where a is the target acceleration, K1 and K2 are constants, Tt is the target intervehicular time, Vo is the own vehicle velocity and Vf is a leading vehicle velocity.

* * * * *